July 24, 1962 K. G. KESSLER ETAL 3,046,473
VERY NARROW-PASS FILTER USING ZEEMAN-SPLIT ABSORPTION LINES
Filed Jan. 26, 1960 3 Sheets-Sheet 1

INVENTORS
KARL G. KESSLER
WALTER G. SCHWEITZER, JR.

BY John C. Stahl

ATTORNEY

July 24, 1962 K. G. KESSLER ETAL 3,046,473
VERY NARROW-PASS FILTER USING ZEEMAN-SPLIT ABSORPTION LINES
Filed Jan. 26, 1960 3 Sheets-Sheet 3

INVENTORS
KARL G. KESSLER
WALTER G. SCHWEITZER, JR.

BY John C. Stahl

ATTORNEY 3,046,473
VERY NARROW-PASS FILTER USING ZEEMAN-SPLIT ABSORPTION LINES
Karl G. Kessler, Bethesda, and Walter G. Schweitzer, Jr., Rockville, Md., assignors to the United States of America as represented by the Secretary of Commerce
Filed Jan. 26, 1960, Ser. No. 4,834
1 Claim. (Cl. 324—.5)

The present invention relates to wavelength standards of length and more particularly to a very precise measurement of length by means of a narrow-pass filter using a Zeeman-split absorption line.

Attempts to define the basic unit of length, the meter, in terms of an unchanging property of nature have been under way for many years. The present standard, the distance between two engraved lines on a platinum-iridium bar, not only lacks the reproducibility and availability that a standard as fundamental as length should have, but, being material, it can be altered or destroyed. As early as 1892, Michelson attacked this problem by measuring the meter in terms of the wavelength of light. This same approach forms the basis for the proposed international standard of length, the orange line from krypton 86. Sources making use of this isotope can furnish standards which should be reproducible to 1 part in $10^8$—a great improvement over the precision obtainable with the meter bar.

As is well known, the precision of a wavelength standard depends upon the measurability of the line to be used. For example, $Kr^{86}$ lamps produce radiation whose wavelength can be measured to a part in 60 million, however, this approaches the theoretical maximum for a discharge tube source. As little further improvement can be expected with the use of other isotopes in discharge tubes, to keep the standardizing laboratories of the various countries well ahead of the requirements of science and technology, the development of very precise length standards must continue.

The improved wavelength standard of length of this invention consists of a highly saturated absorption line in a vapor phase which is Zeeman-split with a magnetic field sufficiently large to just separate the two groups of sigma components. The region of transmission between these two components serves as a narrow-pass filter. The line produced thereby (0.006 cm.$^{-1}$) is one-half the width of the proposed $Kr^{86}$ international standard of length.

An object of the present invention is to provide a very precise measurement of length.

Another object of this invention is to provide a wavelength standard which is readily reproducible and available as a fundamental unit of length.

A further object of this invention is to provide a narrow emission line which is approximately one-half the width of the proposed $Kr^{86}$ international standard of length.

Other objects and features of the invention will become apparent to those skilled in the art as the disclosure is made in the following detailed description of a preferred embodiment of the invention as illustrated in the accompanying sheets of drawings in which.

Figure 1:
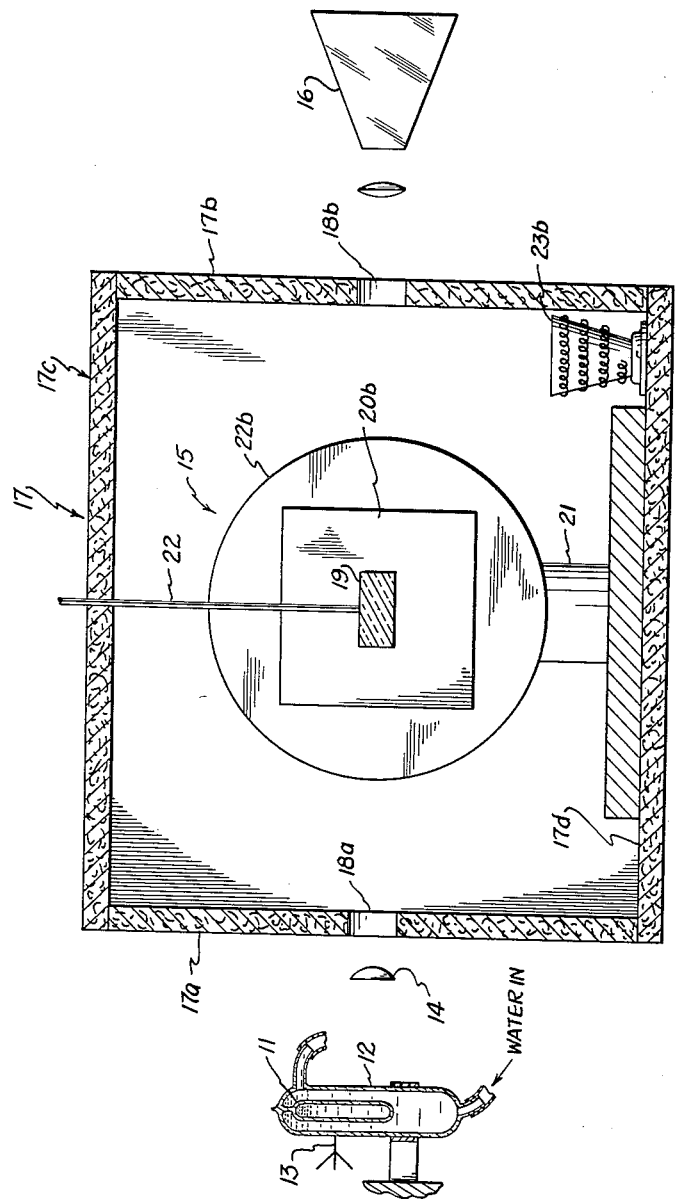
FIG. 1 is a sectional view of apparatus used to obtain very precise measurement of length in accordance with the principles of this invention.

Referring now to the drawings, wherein like reference characters designate like or corresponding parts throughout the several views, there is shown in FIG. 1 a conventional electrodeless lamp 11 containing a small amount of the single mercury isotope, $Hg^{198}$, and which emits 2537–A radiation. Lamp 11 is cooled by water circulating through an outer jacket 12 at a temperature of approximately 15° C. A high-frequency electrical source and feed circuit such as is disclosed in an article by Zelikoff et al., J. Opt. Soc. Am. 42, 818 (1952), is used to excite the lamp 11. The high-frequency electrical energy is coupled to lamp 11 through an antenna or a waveguide cavity resonator indicated diagrammatically at 13.

Radiation from lamp 11 is passed through a collimating lens 14 and a filter 15, hereinafter to be described in detail in connection with FIG. 2 of the drawings. The radiation passed by the filter is analyzed in a conventional manner utilizing a detector 16 consisting of a scanning Fabry-Perot interferometer with a plate separation of, for example, 165 mm. and a recording photoelectric spectrometer.

Figure 2:
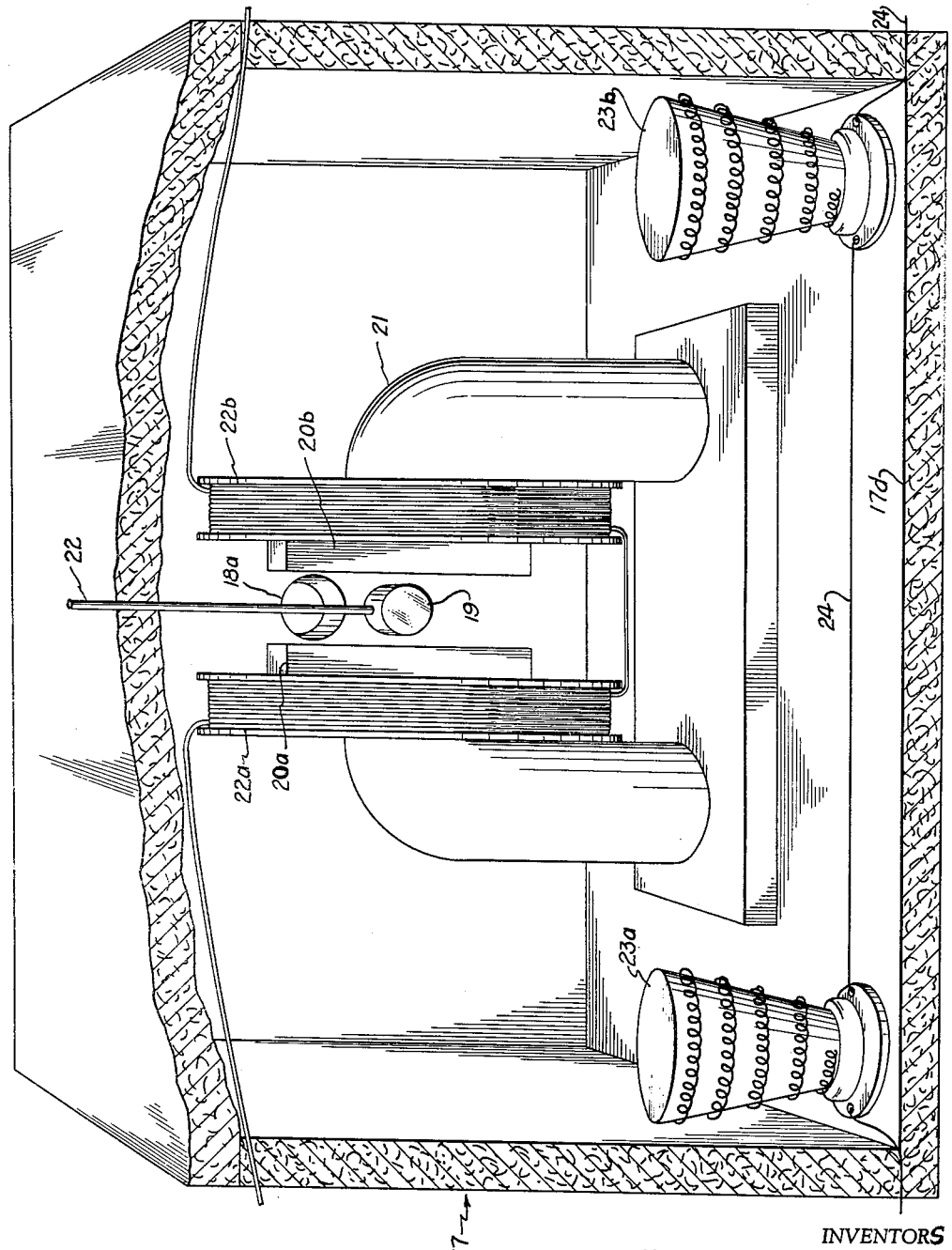
FIG. 2 is a perspective view of a preferred embodiment of the very narrow-pass filter of this invention taken along the longitudinal axis of the system of FIG. 1.

There is shown in FIGS. 1 and 2 of the drawings a thermally insulated chamber 17 providing a constant temperature environment into which the narrow-pass filter 15 of this invention is to be positioned. Circular apertures 18a—18b in the side wall portions 17a—17b, respectively, of chamber 17 are aligned with the longitudinal axis of the system to permit radiation from lamp 11 to pass through the filter 15, in a manner hereinafter to be described, to the detector 16.

As best seen in FIG. 2 of the drawings, a cylindrical absorption cell 19 is adjustably positioned in a uniform magnetic field between the pole faces 20a—20b of an electromagnet 21. It is to be understood, of course, that a permanent magnet producing a magnetic field of equivalent flux may also be utilized. Furthermore, an alternating current may be applied to the series-connected coils 22a—22b thereby modulating the band of wavelengths passed by the filter.

Rod 22, attached to cell 19 in a conventional manner, passes through a bore in the top portion 17c of the chamber and permits the cell 19 to be adjustably positioned between the pole faces 20a—20b of the magnet.

In a preferred embodiment of the invention the cell 19 is cylindrical and constructed of quartz or the like and is approximately one inch in length by three-quarter inch inside diameter. The cell is evacuated and a small quantity of the isotope Hg$^{198}$ placed therein. It should be understood, however, that any single isotope whose nuclear spin is zero may be utilized, i.e., all atoms whose nuclei contain an even number of protons and an even number of neutrons. Alternately, nonzero nuclear spin atoms may also be utilized within the cell 19 if the hyperfine structure of the spectrum line is very small. The elements Be, Mg, Ca, Zn, Sr, Cd, Ba, Hg and Pb are particularly well suited because they all have even-even isotopes and they can be volatized at relatively low temperatures.

Referring again to FIG. 2 of the drawings, heating elements 23a—23b, positioned on the bottom surface 17d of chamber 17 are series-connected as by leads 24 to a control device (not shown) whereby the temperature within said chamber may be regulated to any desired temperature.

Figure 3:
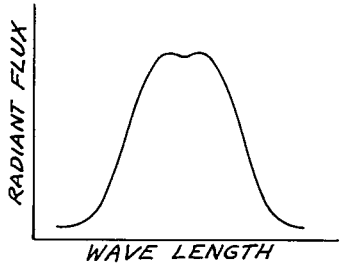
FIG. 3 is a profile of a typical atomic emission line wherein radiant flux is plotted as a function of wavelength.

Referring now to FIG. 3 of the drawings, there is shown a profile of an atomic emission line produced by the lamp 11 containing the isotope Hg$^{198}$. For purposes of convenience only, the radiant energy utilized in this disclosure was derived from excited atoms of the same kind as are used in the filter—this is not a necessary condition. The filter, hereinafter to be discussed in detail, will produce a narrow band of wavelengths for radiant energy of the proper wavelength regardless of the source of that energy. If this radiation passes through a vapor of the same kind of atoms, some of which are in a quantum state corresponding to the lower of the two quantum states, transistions between which produced the emission line, then some of the radiation will be absorbed by these atoms.

Figure 4:
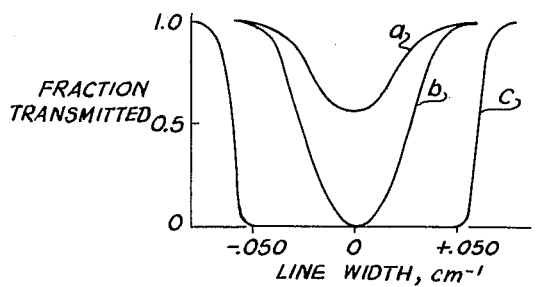
FIG. 4 shows representative transmission characteristic curves for $Hg^{198}$ vapor in the vicinity of its resonance lines wherein the abscissa is in wave numbers and the ordinate is the fraction of the incident energy transmitted.

Upon heating cell 19 to a temperature in the order of 80° C.–100° C. by means of the heaters 23a—23b, heretofore mentioned, a relatively thick layer of atoms is produced which absorb radiation most strongly in the vicinity of its resonance lines. If the density of the absorbing atoms is relatively low, the percentage of absorption as a function of wavelength is represented diagrammatically by curve a, FIG. 4. If, however, the density is higher, the absorption follows curve b. For a highly saturated absorption line (opacity greater than 10) as illustrated by curve c of FIG. 4, the absorption is so thorough over so wide a range that the intense 2537–A radiation from the Hg$^{198}$ lamp 11 is almost completely absorbed. As is well known, for a Doppler-broadened line the slope of the extremities of the absorption line increases as the absorption coefficient is increased.

Figure 5:
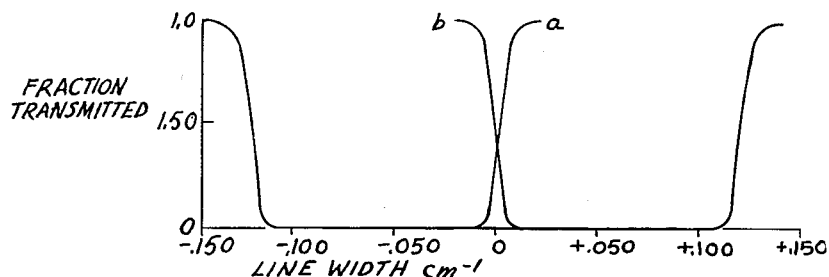
FIG. 5 illustrates the superposition of two highly saturated absorption lines for $Hg^{198}$ vapor and the narrow transmission band produced therebetween.

When the absorption cell 19 is positioned in a homogeneous magnetic field normal to the direction the light travels in the cell, a splitting of components will occur. The exact nature of the splitting will depend upon the quantum states involved in the transition. For a $^1S_0$—$^3P_1{}^0$ transition as in mercury, light which is polarized parallel to the magnetic field experiences essentially the same absorption as without the field—practically all light of this polarization is absorbed. Light which is polarized normal to the magnetic field, however, is absorbed in a manner directly dependent upon the field. As the magnetic field is applied, the broad absorption curve appearing at zero field splits into two components, each of which is similar in shape to curve c, FIG. 4, one of said components or group of components moving toward the shorter wavelengths and the other moving by an equal amount toward the longer wavelengths (see curves a and b, FIG. 5). With a field of about 900 gauss, the two curves are sufficiently separated so that they just partially overlap as shown in FIG. 5 of the drawings. Between the two strong absorption bands there is now a narrow region of transmission.

Figure 6:
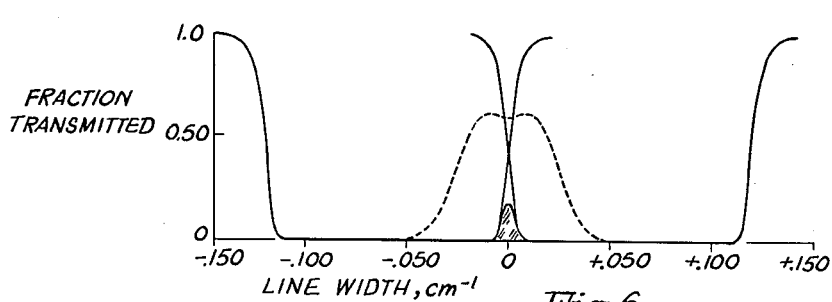
FIG. 6 illustrates the transmission characteristics of a highly saturated absorption line for $Hg^{198}$ vapor in a uniform transverse magnetic field wherein the curve shown in dotted-line portions is the emission line from an $Hg^{198}$ electrodeless lamp and the shaded curve represents the product of the two transmission curves equivalent to the line shape passed by the filter.

As best seen in FIG. 6 of the drawings, when light from the Hg$^{198}$ lamp 11, illustrated in dotted line portions, is passed through cell 19 in the manner heretofore described, the resonance radiation will have a very narrow profile. The shaded curve in said figure represents the product of the two transmission curves and it is equivalent to the line shape passed by the filter. The absorption characteristics of the cell act as a filter and radiation is passed only by the region where absorption does not occur. Instead of the normal width at half-height of about 0.050 cm.$^{-1}$, a mercury line which is 0.006 cm.$^{-1}$ wide is thus obtained. This line is one-half the width of the proposed Kr$^{86}$ international standard of length.

If the spectral width of the incident radiation is greater than the extremities of curves a and b in FIG. 5, energy beyond these limits will pass through the filter. This energy can be further absorbed by similar absorption cells in stronger magnetic fields and/or by other types of filters such as interference filters.

Figure 7B:
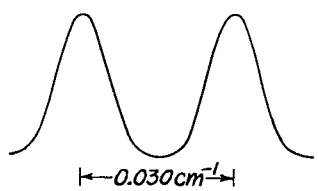
FIG. 7b is an interference fringe as in FIG. 7a illustrating 2537–A radiation from an electrodeless $Hg^{198}$ lamp passed through the Zeeman-split absorption filter of this invention.
Figure 7A:
FIG. 7a is an interference fringe produced by a pressure-scanned Fabry-Perot interferometer with 165 mm. spacer for 2537–A radiation from an electrodeless $Hg^{198}$ lamp.

Interference fringes produced by unfiltered 2537–A radiation is illustrated in the trace of FIG. 7a. The width at half-height for the radiation from this lamp is about 0.050 cm.$^{-1}$, the orders are so thoroughly overlapped that the fringes nearly vanish. The trace of FIG. 7b illustrates the interference fringes produced by radiation from this same lamp after it has been passed through the absorption filter of this invention. The observed line width is approximately 0.011 cm.$^{-1}$. This width includes an instrumental width of approximately 0.005 cm.$^{-1}$ for the Fabry-Perot interferometer.

Calculations of the line width, based on the assumption of Doppler shape, yield a value of 0.007 cm.$^{-1}$ for the width. This is very close to the value which, together with the instrumental width, will yield an observed width of 0.011 cm.$^{-1}$. The ratio of line width to wavelength for the filtered Hg$^{198}$ line is $1.7 \times 10^{-7}$ as compared to $7 \times 10^{-7}$ for the radiation at 6056–A for a Kr$^{86}$ lamp operating at the triple point of nitrogen. The coherent length from this filtered radiation should be in excess of 135 cm.

In a preferred embodiment of the invention magnetic fields in the order of 800–1000 gauss at temperatures in the order of 80° C.–100° C. have been utilized, however, it is to be understood that further narrowing of the filter band can be achieved by operating at higher temperatures and correspondingly higher values of the magnetic field.

The wavelength of light or of radiant electromagnetic energy is frequently used both in metrology and in the control of automatic machinery to measure short distances very accurately. In order to be useful, however, the radiant energy must be concentrated within a very narrow band of wavelengths, such as in a sharp spectrum line. The precision of a measurement is determined largely by the ratio of the width at half intensity to the wavelength of the radiation. The maximum length that can be measured with such a line is approximately determined by the reciprocal of its width at half intensity when that width on the wave number scale is expressed in units of cm.$^{-1}$.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

Apparatus for producing radiation having a very narrow line width comprising: an electrodeless lamp containing only the 198 isotope of mercury, means for exciting said lamp to produce radiation therefrom, means for collimating said radiation, and means positioned in the path of said collimated radiation for absorbing all but a narrow line width thereof, said absorbing means comprising a cell containing only the 198 isotope of mercury, means for subjecting said cell to a magnetic field of at least 800 gauss, said magnetic field being applied transversely to the axis of said collimated radiation, and means for heating said cell to a temperature of at least 80° C.

(References on following page)

References Cited in the file of this patent

Malinowski: Annalen der Physik, vol. 44, 1914, pages 935 to 968.

Mrozowski: Bulletin International de L'Academie Polonaise des Sciences et des Lettres, Issue No. 8A, October, 1930, pp. 464 to 503 incl.

Mitchell et al.: Resonance Radiation and Excited Atoms, Cambridge University Press, New York, 1934, pages 127 and 128 relied upon.

Crosswhite et al.: American Institute of Physics Handbook, McGraw-Hill, New York, 1957, 4 pages 7–42, 7–43, 7–119, and 7–120 principally relied upon.

Kessler et al.: Journal of the Optical Society of America, vol. 49, No. 2, February 1959, p. 199.